United States Patent [19]

Bauer

[11] Patent Number: 4,637,043
[45] Date of Patent: Jan. 13, 1987

[54] X-RAY SHEET FILM CASSETTE FOR APPLICATION TO ANGULAR BODY PARTS

[75] Inventor: Walter Bauer, Munich, Fed. Rep. of Germany

[73] Assignee: AGFA-Gevaert AG, Leverkusen, Fed. Rep. of Germany

[21] Appl. No.: 689,557

[22] Filed: Jan. 7, 1985

[30] Foreign Application Priority Data

Jan. 18, 1984 [DE] Fed. Rep. of Germany ....... 3401577

[51] Int. Cl.⁴ .............................................. G03B 42/04
[52] U.S. Cl. .................................... 378/188; 378/182; 378/185; 378/186; 378/187
[58] Field of Search ............... 378/182, 185, 186, 187, 378/188; 220/338, 339, 340

[56] References Cited

U.S. PATENT DOCUMENTS

| 2,526,458 | 10/1950 | BronnerKant | 220/338 |
| 3,135,864 | 6/1964 | Sano | 378/188 |
| 4,339,038 | 7/1982 | Bauer | 378/188 |

FOREIGN PATENT DOCUMENTS

| 2512683 | 9/1976 | Fed. Rep. of Germany. |
| 2727005 | 1/1978 | Fed. Rep. of Germany. |
| 2842230 | 4/1980 | Fed. Rep. of Germany ...... 220/339 |

Primary Examiner—Craig E. Church
Assistant Examiner—John C. Freeman
Attorney, Agent, or Firm—Michael J. Striker

[57] ABSTRACT

An X-ray sheet film cassette is assembled of a bottom wall, side walls and a cover hinged to an upper part of one side wall. The lower part of the one side wall adjoining the bottom wall is reduced in thickness to form an abutment for the sheet film. The inner surface of the cover is provided with a resilient pressing pad which during the closing of the cover urges the sheet film against the abutment and in the closed condition of the cassette presses the film against the bottom. In this manner, when taking X-ray pictures of a part of patient's body which forms an angle relative to another body part, the unexposed section of the first mentioned body part which is adjacent the other body part, is minimized and well defined in position relative to the other body part.

8 Claims, 6 Drawing Figures

X-RAY SHEET FILM CASSETTE FOR APPLICATION TO ANGULAR BODY PARTS

BACKGROUND OF THE INVENTION

The present invention relates to an X-ray sheet film cassette for taking X-ray pictures of body parts forming an angle with one another, the cassette being assembled of two mutually swingable parts hinged one to the other a one side and locatable at the opposite side. One of the cassette parts has thin walls and is constructed for receiving a sheet film supported on the inner surface of a broad or bottom side of the cassette and an edge of the film abuts against the inner surface of a narrow side of the one cassette part which is brought in contact with a part of the patient's body. The other cassette part has a broad side provided with a resilient pressure pad which in closed condition of the cassette presses the sheet film against the supporting surface of the thin-walled cassette part. Preferably, the pressure pad is provided with a reinforcing foil engaging the film.

In conventional, commercially available cassettes of this kind the locking means are arranged on the upper surface of the cover cassette part, above the thin-walled narrow side of the other cassette part. In closing the cassette, the resilient pressing pad of foam rubber which is provided with the reinforcing foil, first engages with its edge remote from the locking means the sheet film and during tilting of the cover cassette part displaces the film away from the thin-walled narrow side toward the opposite narrow side provided with the hinge mount. Since during the picture taking of angular body parts (for example in mammography or in exposing chin and lower jaw) it is desirable that exposed body part be reproduced as close as possible to the other part and the marginal areas of the film should not be positioned in an uncontrolled manner, it is important that the narrow side of the cassette which is in contact with a body part be not only extremely thin (of about 1 mm wall thickness) but also that the film be always in abutment with the inner surface of the thin-walled narrow side. The unavoidable 1mm marginal area (wall thickness of the thin narrow side) of the exposed angular body part does not appear on the X-ray picture. It is therefore a great disadvantage that in conventional cassettes the sheet film is shifted by the pressing pad away from this thin-walled narrow side and the marginal zone of the exposed body part which does not appear on the picture cannot be controlled during the insertion of the film in the cassette and frequently this zone is substantially greater than the wall thickness of the side of the cassette which is applied to the patient's body.

SUMMARY OF THE INVENTION

It is therefore a general object of the present invention to overcome the aforementioned disadvantage.

More particularly, it is an object of the invention to provide an improved X-ray sheet film cassette of the aforedescribed kind in which it is always ensured that the inserted sheet film after closing the cassette is always in contact with the thin-walled narrow side which is applied to the patient's body and that it remains in this position during the entire picture taking operation.

In keeping with this object and others which will become apparent hereafter, one feature of the invention resides, in the cassette of the afore described kind, in the provision of a hinge mount which is attached to the thin-walled narrow side of the cassette which is applied against a body part, the outer surface of the hinge mount being flush with the outer surface of the cassette and the inner surface of the hinge mount being clear of the film supporting inner surface of the cassette about a distance which equals at least to the spacing between the reinforcing foil of the pressure pad and the film supporting inner surface in the closed condition of the cassette.

Due to the fact that the thin-walled narrow side of the cassette is the hinge side and the hinge mount is spaced apart from the film supporting inner surface of the cassette at such a distance as to permit the shifting of the film against the thin-walled portion underneath, it is achieved that the reinforcing foil on the pressing means which are arranged on the other cassette part (not applied against patient's body) engages gradually the film during closing of the cassette and urges the same against the thin-walled lateral side below the hinge mount so that the film is always shifted toward the thin lateral side and never away from it. Due to the flush arrangement of the hinge mount with the upper surface of the narrow lateral side of the cassette an exact positioning of the latter on the patient's body is achieved. On the other hand, the flush arrangement of the hinge mount with the cover part of the cassette which is not in contact with the patient's body is not absolutely necessary. An additional advantage of this invention is the extension of the resilient pressing means and/or of its reinforcing foil on the thin-walled other cassette part in the range below the hinge mount so as to serve as a labyrinth-like light seal at the thin-walled lateral side where the labyrinth-like sealing like that on the other three sides of this cassette part, cannot be accommodated. The light sealing pressing means overlap the entire hinge mount or extend beyond the latter as far as to the lateral range of the cassette to cooperate with the labyrinth-like seals of the two cassette sides extending at right angles thereto.

Hinge mounts for cassettes of this type are known which occupy only a small part of the wall thickness of the cassette (German Pat. No. 2,727,005, German Publication No. 2,512,683, German Pat. No. 653,858 or U.S. Pat. No. 2,213,437). These prior art arrangements of the hinge mount however do not fulfill the purpose of this invention because they do not provide for the minimum marginal gap on the exposed film. In such prior art solutions, the hinge mount is either projecting above the outer surface of the cassette or the hinge mount is not arranged above the thin-walled side of the cassette.

The novel features which are considered as characteristic for the invention are set forth in particular in the appended claims. The invention itself however both as to its construction and its method of operation, together with additional objects and advantages thereof will be best understood from the following description of specific embodiments when read in connection with the accompanying drawing.

DESCRIPTION OF THE PREFERRED EMBODIMENTS

Figure 1:
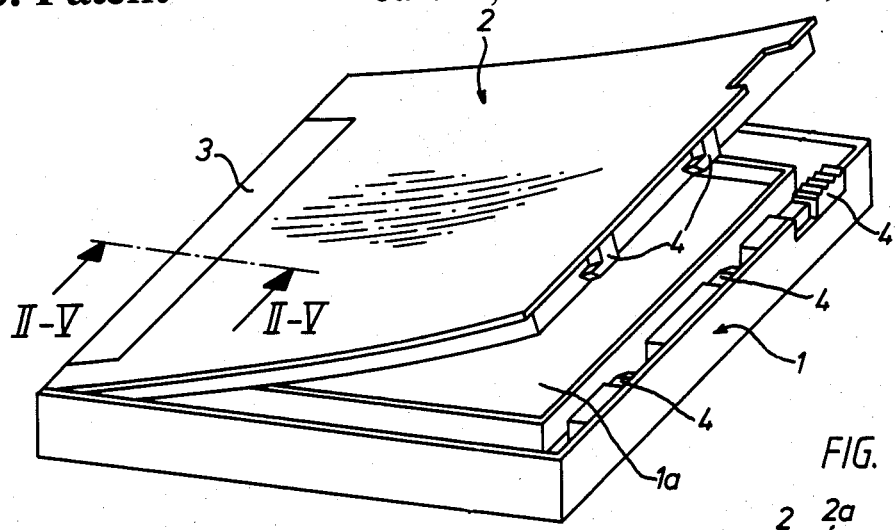
FIG. 1 is a schematic, perspective view of an X-ray sheet film cassette according to this invention, shown in a partly open condition.

The X-ray sheet film cassette of this invention has the configuration of a flat rectangular prism and is assembled of two cassette parts 1 and 2 tiltably connnected one to another by a hinge mount 3 arranged at one narrow side wall 1b of the cassette. The opposite narrow side wall of the cassette is provided with locking means 4. The cassette part 1 includes a bottom wall 1' the inner surface 1a of which serves as a supporting area for a sheet film 5. A non-illustrated first reinforcing foil can be arranged between the film 5 and the supporting area 1a. The other cassette part 2 serves as a cover and is provided with film pressing means in the form of a pressing pad 6 of foam rubber provided on its pressing surface facing the film 5, with a reinforcing foil 7. Both cassette parts 1 and 2 are made of a relatively strong and stable plastic material. For reinforcing the broad cover part 2 of the cassette, there are provided webs 2a to which a thin plate 8 of plastic material is welded. The pressing foam rubber plate 6 is connected to the plate 8, preferably by gluing.

In taking X-ray pictures of body parts which form an angle with another body part, for example in the mammography or in exposing chin and lower jaw, it is important that the walls of the cassette which are brought in contact with the patient's body (walls 1' and 1b) be as thin as possible so that the broad bottom wall 1' of the cassette which is applied against one body part be permeable to X-rays and the narrow side wall 1b should not exceed 1 mm in thickness. At the same time, in the closed cassette the edge of the sheet film 5 facing the side wall 1b should abut against the inner surface of the latter so that the picture of the exposed body part be as close as possible to the other body part forming an angle therewith. The unavoidable narrow discontinuity of the picture between the two body parts corresponding to the 1 mm wall thickness of the wall side 1b of the cassette, can be tolerated but this gap must be kept as narrow as possible and must have an exactly predetermined size which must not be increased by an inaccurate position of the film 5.

In order to keep or to urge during the loading and closing of the cassette parts 1 and 2, the inserted film into abutment against the inner surface of the lower portion of the side wall 1b, the hinge mount 3 is arranged above the thin-walled portion and extends parallel to the latter. At the same time, in order that the hinge mount 3 do not interfere with the proper positioning of the cassette on a patient's body, the upper surface of the hinge mount is flush with the outer surface 1d of the thin side wall 1b. Preferably, the hinge mount 3 is also flush with the upper surface of the cover part 2 of the cassette. Consequently, the outer surfaces 1c and 1b of the cassette which are brough in contact with a patient's body do not exhibit any interfering projections or steps. In the interior of the closed cassette, the hinge mount 3 reaches at most to the level the reinforcing foil 7 of the pressing pad 6. As a result of this arrangement, the leading edge 7a of the reinforcing foil 7 which during the closing of the cover part 2 first engages the film 5, urges the latter against the inner surface of the lower portion of side wall 1b so that the proper position of the film in the cassette is always ensured. While in the prior art commerically available cassettes of this type the film is urged away from the thin-walled active lateral side of the cassette, the arrangement of this invention guarantees that the inserted film sheet 5 always remains in its correct position in contact with the thin-walled narrow side 1b. Even an improperly inserted film sheet which in the opened condition of the cassette may be spaced apart a small distance from the inner surface of the narrow lateral side 1b, is automatically displaced by the frictional engagement of the resilient pressing elements 6 and 7 on the moving cover part 2 in such a manner that it is always aligned in contact with the inner surface of the thin-walled side 1b below the hinge mount 3. Accordingly, it is always ensured that the film is automatically shifted to its correct position in which the entire exposed body part is reproduced with the exception of the 1mm gap with respect to the other angular body part. The construction of the interior of the cover part 2 can be provided with additional layers as usual in the design of X-ray cassettes.

In the cassette of this invention a light sealing labyrinth is provided only at those side walls of the cassette which adjoin or juxtapose the thin-walled side 1b because the sheet film must abut against this side 1b. In order to prevent any penetration of light from the direction of the cover part 2 or of the hinge 3, the reinforcing foil 7 and preferably also the pressing pad 6 and the plastic foil 8 are extended in length in the direction of the hinge mount 3 to overlap the rear edge of the cover part 2. The hinge mount 3 on the thin-walled side 1b extends downwards to such a height only as to engage the overlapping portion of the reinforcing foil 7 and/or of the pressing pad 6 and/or the plastic plate 8 or other corresponding interior parts of the cassette so as to produce a shielding effect similar to the labyrinth.

FIGS. 2 through 6 show modifications of hinge mount 3 applicable in connection with corresponding modifications of parts 1b, 2, 5 and 7 of the cassette part 1.

Figure 2:
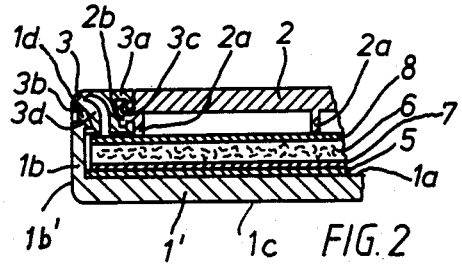
FIG. 2 is a cross-section, at right angles to the hinge mount, of a cutaway part of the cassette of FIG. 1, shown in closed condition.
Figure 3:
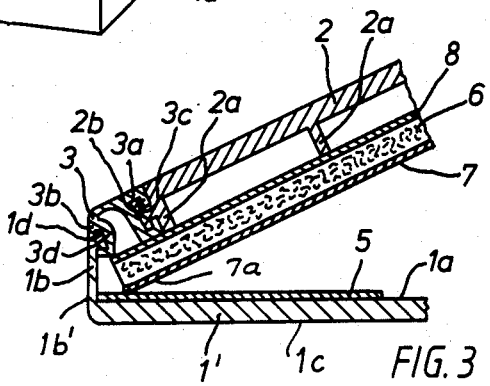
FIG. 3 is a view similar to FIG. 2 showing the cassette in a partially open condition.

In the embodiment modifications according to FIGS. 2 and 3, the hinge mount 3 is formed by a folded or angle shaped strip of plastic material whose fold constitutes a hinge link. Sections 3a, 3b, of the fold of the strip are porvided with curved grooves 3c, 3d for engaging complementary, rib-shaped curved projections 2b and 1d on the cover part 2 and the bottom part 1. The joint of grooves 3c or 3d with projections 2b or 1d can be effected either by inserting the ribs 2b or 1d in the longitudinal direction of the grooves 3c or 3d. Depending on the elasticity and shape of the grooves, the complimentary ribs can be also pressed into the grooves 3c or 3d in a transverse direction. It will be seen in FIGS. 2 and 3 how the extended left hand portion of the elements 6 through 8 overlapping the pressing rear edge of the cover part 2, project under the sections 3a, 3c of the hinge mount on the cover part 2 and in the closed position of the cassette (FIG. 2) are located below the hinge parts 3b, 3d attached to the side wall 1b of the lower cassette part 1.

Figure 4:
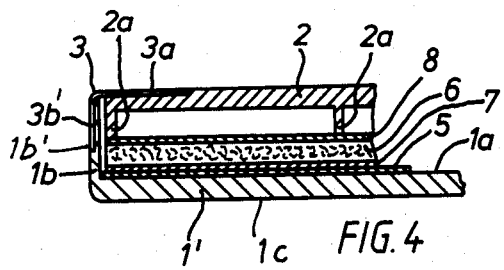
FIG. 4 is a sectional side view of a modification of the cassette of FIG. 1, shown in closed condition.

In the embodiment according to FIG. 4, the hinge mount 3 is made of a folded or longitudinally angled band of a synthetic material whose sections 3a', 3b' on both sides of the fold or of the edge are attached by gluing in complementary grooves or recesses in the upper surface of the cover 2 and of the narrow side wall 1b. Similarly as in the preceding embodiment, the outer surface of the hinge band is flush with the corresponding outer surfaces of the cassette. At least one of the component parts 6 through 8 of the pressing pad bridge in the closed condition of the cassette the narrow gap between the cover 2 and the thin-walled side 1b; the narrow gap may result due to the unavoidable play between the two hinged cassette parts. If desired, the thin plastic plate 8 in all embodiments can be extended laterally as far as to the range of the labyrinth 1c to provide an additional seal at the ends of the hinge mount.

Figure 5:
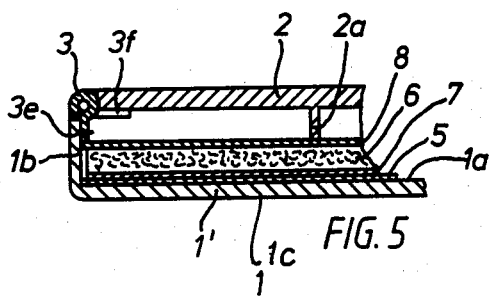
FIG. 5 is a sectional side view of another embodiment of the cassette of this invention, shown in closed condition.
Figure 6:
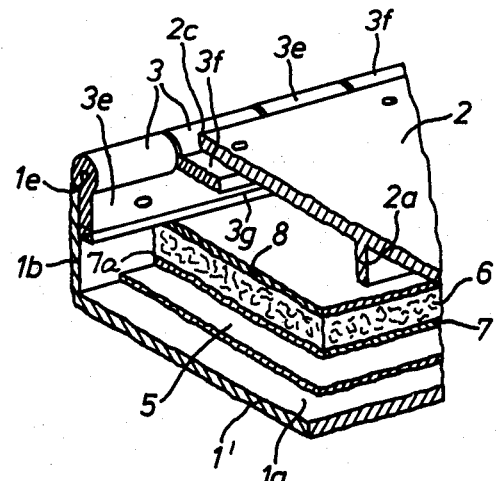
FIG. 6 is a perspective view of a cutaway part of the cassette of FIG. 5.

In the embodiment according to FIGS. 5 and 6 where there is employed a conventional hinge mount assembled of interleafed hinge parts 3e and 3f connected respectively to the inner surface of the thin-walled side 1b and of the cover 2. In order to provide a seal against light, the hinge part 3e mounted on the thin-walled side 1b is provided with a sealing strip 3g extending along the inner surface of the hinge member 3e. the height of this strip 3g is again dimensioned such as to engage in the closed condition of the cassette the overlapping part of the foil 8 or of the foam rubber pressing plate 8 and-/or of the reinforcing foil 7. In this manner, a gap which may result between the hinge member 3e, 3f and the pressing parts 6, 7 and 8 above the X-ray sheet film 5, is effectively sealed. The edges 1e, 2c of the thin-walled side 1b and of the cover 2 which adjoin the corresponding hinge members 3e, 3f match the rounded edges of the hinge members and/or transit tangentially over the upper surfaces of the hinge members in order to eliminate any disturbing steps or projections.

While the invention has been illustrated and described as embodied with specific examples of the hinge mount, it is not intended to be limited to the details shown, since various modifications and structural changes may be made without departing in any way from the spirit invention. For example, the hinge mount 3 can be of any conventional construction provided that it has a flat configuration matching the flat surfaces of the cassette and is impermeable to light. Also the arrangement of the layers of the pressing means inside the cassette can be different. In principle, the cassette can be made also of metal instead of a synthetic material, and for pressing the sheet film against the bottom, a magnet and a counteracting plate can be provided. In the embodiment of FIG. 4, the hinge mount can be in the form of a adhesive tape which is extremely thin and consequently any recesses in the upper surface of the side wall 1b and of the cover 2 can be dispensed with.

Without further analysis the foregoing will so fully reveal the gist of the present invention that other can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An X-ray sheet film cassette for taking pictures of a part of patient's body which forms an angle with another body part, comprising a receptacle in the form of a flat quadrangular prism for receiving an X-ray sheet film, the receptacle having a bottom wall, side walls and a cover: said bottom wall supporting said sheet film on its inner surface while its outer surface being engageable with the part of the patient's body; one of said side walls being reduced in thickness relative to the remaining walls and having a flat outer surface engageable with the other part of patient's body; a hinge mount secured to upper part of said one side wall and to an edge of said cover to turn the cover between an open and a closed position, said hinge projecting above the inner surface of a lower part of said one side wall; a resilient pressure means arranged on the inner surface of said cover and having a leading edge portion engaging during the turning movement of said cover said sheet film and displacing the same into abutment against said lower part of said one side wall and in the closed position of said cover, said pressure means holding said sheet film on said bottom wall.

2. An X-ray sheet film cassette as defined in claim 1 wherein the thickness of the lower part of said one side wall is at most 1 mm.

3. An X-ray sheet film cassette as defined in claim 1 wherein said hinge is flush with said flat outer surface of said one side wall.

4. An X-ray sheet film cassette as defined in claim 1 wherein said resilient pressure means includes projections formed on the inner surface of the cover, a plate of a plastic material secured to said projections, a rubber foam plate secured to the thin plate, a reinforcing foil secured to the foam rubber plate; and at least the reinforcing foil of the pressure means being extended in length to project in the closed condition of the cassette, under said hinge mount.

5. An X-ray sheet film cassette as defined in claim 4 wherein the hinge mount is in the form of a folded strip of synthetic material, the end portions of the strip on opposite sides of the fold being provided with curved grooves, and the corresponding end portions of the cover and of said one side wall having complementary projections snugly fitting into said curved grooves.

6. An X-ray sheet film cassette as defined in claim 4 wherein the hinge mount is in the form of a folded band of synthetic material engaging corresponding recesses in the outer surface of said one side wall an said cover, the band being secured in the recesses by gluing.

7. An X-ray sheet film cassette as defined in claim 4 wherein the hinge mount is assembled of linkage hinge members secured to the inner surfaces of said one side wall and of said cover, and further including a screening strip arranged along the hinge member on said one side wall, and screening strip in the closed condition of the cassette engaging the extended part of said pressure means.

8. An X-ray sheet film cassette as defined in claim 7 wherein said hinge members are rounded and the adjoining edges of said one side wall of said cover matching the rounding of said hinge member and tangentially transiting to the rounding.

* * * * *